United States Patent
Lipovetskaya et al.

(10) Patent No.: US 7,382,520 B2
(45) Date of Patent: Jun. 3, 2008

(54) CHARGE CONTROL AGENTS IN DISPLAY MEDIA

(75) Inventors: Yelena Lipovetskaya, Howell, MI (US); Dale Smith, Ann Arbor, MI (US); Frederick L. Sibley, Brooklyn, MI (US); Lori Schairer, Jackson, MI (US); Martin Lu, Mundelein, IL (US)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 11/211,534

(22) Filed: Aug. 26, 2005

(65) Prior Publication Data

US 2007/0047063 A1 Mar. 1, 2007

(51) Int. Cl.
*G02B 26/00* (2006.01)

(52) U.S. Cl. .................. 359/296; 345/85; 345/107

(58) Field of Classification Search ............... 359/296; 345/85, 107

See application file for complete search history.

(56) References Cited

U.S. PATENT DOCUMENTS

| | | | |
|---|---|---|---|
| 4,126,854 | A | 11/1978 | Sheridon |
| 4,143,103 | A | 3/1979 | Sheridon |
| 4,261,653 | A | 4/1981 | Goodrich |
| 4,438,160 | A | 3/1984 | Ishikawa et al. |
| 5,389,945 | A | 2/1995 | Sheridon |
| 6,335,818 | B1 | 1/2002 | Torres |
| 6,362,915 | B1 | 3/2002 | Sheridon et al. |
| 6,485,280 | B1 | 11/2002 | Richley |
| 6,496,298 | B1 | 12/2002 | Sheridon et al. |

*Primary Examiner*—Evelyn A. Lester
(74) *Attorney, Agent, or Firm*—Pillsbury Winthrop Shaw Pittman LLP

(57) ABSTRACT

Charge Control Agents In Display Media. Use of charge control agents in display media comprising bichromal elements increases the ability to control translation and rotation of spherical elements in their cavities more precisely, thus yielding sharper and clearer images and longer life at lower applied voltages.

23 Claims, 3 Drawing Sheets

CHARGE CONTROL AGENTS IN DISPLAY MEDIA

BACKGROUND

U.S. Pat. Nos. 6,335,818, 6,362,915 and 6,496,298 are assigned to the same assignee of the present application. The entire disclosures of these patents and others that are cited in the REFERENCES below are incorporated herein by reference in their entirety.

Disclosed are additives used in making well-behaved bichromal elements in display media, such as Gyricon displays, which are known. Bichromal elements, which are spherical in shape and of about 50 microns in diameter, perform the function of pixels in images formed in these displays, as described further below. Usually, the images suffer from poor quality because the bichromal balls having oppositely colored hemispheres with opposite charges do not assume proper positions; that is, they do not rotate in a precise manner, so as to make the images sharp and clear. What is needed, therefore, is a means for making the bichromal balls behave well and predictably. The charge control agents (CCAs) that are disclosed herein are used as an additive during compounding of black and white waxes that are components of bichromal Gyricon balls to provide better hemispherical control of charges, and hence improved performance under varied electric fields to yield enhanced images on especially Gyricon displays.

Display media, such as Electric Paper or twisted ball panel display devices, are known and are described, for example, in REFERENCES given below and are incorporated herein by reference in their entirety. The media generally are comprised of an encapsulant medium material, for example, an elastomer, such as a cured polysiloxane, sandwiched between two indium tin oxide coated substrates, such as glass or Mylar™. Generally, the elastomer layer has closely packed cavities, each containing a bichromal sphere suspended in a dielectric liquid. The dielectric liquid may also be present in substantial amounts in the elastomer matrix. In media that are active in an electric field, the bichromal spheres have a net dipole due to different levels of charge on the two sides of the sphere. An image is formed by the application of an electric field to each pixel of the display, which rotates the bichromal spheres to expose one color or the other to the viewing surface of the media. The spheres may also have a net charge, in which case they will translate in the electric field as well as rotate. When the electric field is reduced or eliminated, the spheres ideally do not rotate further; hence, both colors of the image remain intact. This image bistability is one feature of display media made with bichromal Gyricon balls.

The composition of certain bichromal spheres is known, for example, as set forth in the references given below. The spheres comprise black polyethylene with a light reflective material, for example, titanium oxide, sputtered on one hemisphere. In a different approach, a rotary ball is prepared by coating white glass balls of about 50 microns in diameter, with an inorganic coloring layer such as indium by evaporation. In a similar process, bichromal balls comprising glass balls are first heavily loaded with a white pigment such as titanium oxide, followed by coating from one direction in a vacuum evaporation chamber with a dense layer of nonconductive black material which coats only one hemisphere.

Methods and apparatus for fabricating bichromal elements are known and referenced below. One apparatus comprises a separator member having opposing first and second surfaces and an edge region in contact with both surfaces, and delivery means for flowing first and second colored hardenable liquid material over the first and second surfaces, respectively, so that the liquid materials arrive at the edge, usually at substantially the same flow rate, and form a reservoir outboard of the edge region. The reservoir comprises side-by-side regions of different colors, which in a preferred embodiment, do not intermix. Further means are provided for propelling the first and second liquid materials away from the separator member and out of the reservoir into a fluid medium. As this occurs, a plurality of forward ends of side-by-side bichromal streams become unstable and break up into droplets. The droplets form into spherical balls, each of the balls approximately comprising hemispheres of differently colored hardenable liquids. These bichromal balls are from about 5 to about 200 microns in diameter.

The aforementioned display media can suffer from drawbacks caused by incomplete or lack of rotation of the bichromal balls. When the balls do not rotate close to 180 degree, the switching from one color to the other is not complete. As a result, image quality suffers. In some cases, increasing the strength of the electric field used to rotate the spheres can help in achieving more complete rotation, but in other cases sufficient rotation cannot be attained, even at higher fields. In the latter cases, it is believed that the dipole strength of the sphere relative to the monopole strength is too small, rendering it difficult to get sufficient rotation before the sphere translates across its cavity in the elastomer matrix. Many of the balls lack sufficient monopole and dipole strengths to dislodge them from the cavity walls.

Materials that can improve the rotational behavior of bichromal balls could enable display media to be used in a wider variety of applications than is currently possible. For example, materials that provide a more reproducible and lower voltage for rotation and a sharper voltage threshold above a certain value can be used to make bichromal passive matrix displays in which balls that do not experience a sharp threshold voltage do not alter their state. Therefore, it is desirable to provide a display media wherein a threshold voltage of a particular value exists. It is further desirable to provide a display media wherein the threshold voltage is sharper to eliminate most, or ideally all, of the rotation below the threshold voltage and more complete rotation can be obtained at a lower applied voltage. It is still further desirable to provide a display media in which the balls have sufficient monopole and dipole strengths to allow the electric field not only to pull them from the cavity walls and translate, but also to rotate those 180° completely.

Disclosed herein are additives used in making well-behaved bichromal elements in display media. The additives comprise charge control agents (CCAs) that enable lower switching voltages, faster and more complete rotation of balls, less stiction on the cavity walls, and more distinct voltage thresholds for displays and display media containing bichromal spheres or balls, and in particular, Gyricon balls. The bichromal ball formulation disclosed herein provides improvingly stronger monopole and dipole strengths.

REFERENCES

U.S. Pat. No. 6,496,298 describes a display media with an encapsulant medium, and bichromal beads having a charge adjuvant, wherein the bichromal beads are dispersed or contained in the encapsulant medium is set forth.

U.S. Pat. No. 6,485,280 describes an apparatus for fabricating bichromal elements comprising a separator member having a central rotating point, the separator member having first and second spaced apart, opposed surfaces with an edge region in contact with both of said opposed surfaces. The spacing between the opposed surfaces varies with the distance outwardly from the central rotating point such that the spacing is the largest at the central rotating point and the spacing decreases outwards from the central rotating point and the spacing is a minimum at the edge region. Further each of the opposed surfaces has a substantially annular cup spaced apart from and substantially surrounding the central rotating point. The apparatus for fabricating bichromal elements also includes apparatus for dispensing first and second differently colored hardenable liquids in the cups of the first and second surfaces, respectively, and an apparatus for substantially uniformly spreading the liquid material in the annular cups located in the first and second surfaces and for substantially uniformly spreading the liquid material from the cups over the first and second surfaces toward said edge region to form a reservoir of liquid material outboard of said edge region, and for forming ligaments from said reservoir.

U.S. Pat. No. 5,389,945 describes an addressable display system including a paper-like sheet comprising a light transparent host layer loaded with a plurality of repositionable elements, the elements are movable from a first orientation in which they will present a first visual appearance, to a second orientation in which they will present a second visual appearance, and independent external addressing means relatively movable with respect to the display sheet for affecting the orientation of the repositionable elements U.S. Pat. No. 4,438,160 describes a method for manufacturing rotary ball display devices wherein a plurality of such balls are provided with a coating of a color different from the remainder of the ball, the ball members are coated with a thin coating insoluble in the settling medium into which they are introduced, so that upon settling into a low viscosity liquid, they form a uniform layer. A high molecular weight hardenable coating material which is soluble in the low viscosity liquid is then poured onto the coated ball members to cover the layer. Then, the low viscosity liquid is removed and the hardenable coating material is caused to harden. The thin coating is then dissolved away from portions of the ball members to leave cavity portions thereabout into which a high resistivity liquid is introduced. The resulting ball members have a refractive index on the colored layer which is substantially the same as the refractive index of the high resistivity liquid contained in the cavities.

U.S. Pat. No. 4,261,653 describes a light valve formed of a plurality of spherical dipolar particles suspended in a matrix material. Each spherical dipolar particle has a unified body formed in three discrete symmetrical sections. A central section is configured to permit light transmission when in a first orientation with respect to a path of light travel, and generally not permit light transmission when in a second, transverse orientation with respect to the path of light travel. Pair of intermediate sections bound the central section and is formed of a transparent material having an electrical permittivity that varies through a range of values as a function of the frequency of an applied electric field. A pair of outer sections bounds the intermediate sections and is formed of a material having a relatively stable electrical permittivity within the range of values of the intermediate sections. An applied electric field at one frequency extreme will cause the spherical dipolar particle to align in the first orientation to permit light transmission, and an applied electric field in the other frequency extreme will cause the particle to anti-align in the second, transverse orientation to shutter or reflect light. The matrix material is preferably formed of a plasticized elastomer that has a plurality of expanded cavities, with each cavity containing an outer lubricating layer to allow free rotational motion of a dipolar particle in the cavity. The use of a light valve of the invention and method of manufacturing the spherical dipolar particle construction are also disclosed.

U.S. Pat. No. 4,143,103 describes a method of making a display characterized by a plurality of particles which have an electrical anisotropy due to hemispherical surface coatings of different Zeta potential and their distribution in a volume of a dielectric liquid and which also have an optical anisotropy due to the hemispherical surface coatings having different optical characteristics. The particles are mixed with a light transparent liquid which is subsequently cured to form an elastomeric or rigid slab. Following curing of the liquid, the slab is immersed in a plasticizer (dielectric liquid) which is absorbed by the slab and which causes the slab to expand slightly. Expansion of the slab around the particles provides a plasticizer-filled cavity around each particle which cavities allow the particles to rotate to provide a display in accordance with their optical anisotropy but does not allow substantial translation of the particles.

U.S. Pat. No. 4,126,854 describes a display system in which the display panel is comprised of a plurality of particles which have an electrical anisotropy due to hemispherical surface coatings of different Zeta potential and their distribution in a volume of a dielectric liquid, and which also have an optical anisotropy due to the hemispherical surface coatings having different optical characteristics which may be due to the color or other optical properties of the hemispherical coatings. Under the action of an external electric field, the particles will rotate in accordance with their electrical anisotropy to provide a display in accordance with their optical anisotropy. The display has switching threshold and memory capabilities.

SUMMARY

Aspects disclosed herein include a display comprising bichromal elements having portions containing components that control—substantially independent of the influence of other materials in said portions—the motion of said bichromal elements encapsulated in cavities formed in a medium; wherein the medium forms the display.

a display media comprising an encapsulated medium; and bichromal balls comprising a charge control agent; wherein the bichromal balls are dispersed in the encapsulant medium;

wherein the charge control agent comprises Copy Charge PSY, Copy Charge N4P, Hostacopy N4P-N101 VP2624, Hostacopy N4P-N203 VP2655, Hostacopy Charge PX04, Copy Charge NY VP2351, Copy Level NCS or Copy Blue PR Solvent Blue 124;

wherein charge control agent comprises triphenylmethane, ammonium salts, al-azo complex, Ca-polymer salt, modified inorganic polymeric compounds, chromium compounds, aluminum salicylate, zinc salicylate, zirconium salicylate, boron salicylate, boron acetyl type, chrome-azo complex, iron-azo complex or silicon oxide.

DETAILED DESCRIPTION

In embodiments there is illustrated:

a display media using charge control agents (CCA) in bichromal elements of the display. The elements are generally spherical in shape, such as a ball, though they may also assume oval and cylindrical shapes, as well as other non-spherical shapes such as beads. However, for illustrative purposes, these terms may be used interchangeably. Also, a bichromal element may have a plurality of portions comprising two hemispherical parts or several sectors forming the body of the bichromal element.

The charge control agents incorporated to one or both hemispheres of the bichromal balls provide different and precisely controlled properties. In the presence of the charge control agents, the hemispheres become positively or negatively charged without relying on the pigments. It will be understood that either hemisphere may be positively or negatively charged. The type and amount of the specific charge control agent is selected to provide desired amount of charge generated. Appropriate selection of the charge control agents for use in one or both hemispheres allows precise control of both monopole and dipole charge on the bichromal ball. Ability to precisely control electric properties of bichromal balls provides reliable and consistent manufacturing of the bichromal balls and well-behaved operation of electronic display. Ability to manipulate amount of charge on the balls as a whole and individually on each hemisphere independently, as disclosed below, provides flexibility to make electronic displays that can operate in a wide range of voltage requirements. Long-term reliability of the displays is also improved.

Figure 1A:
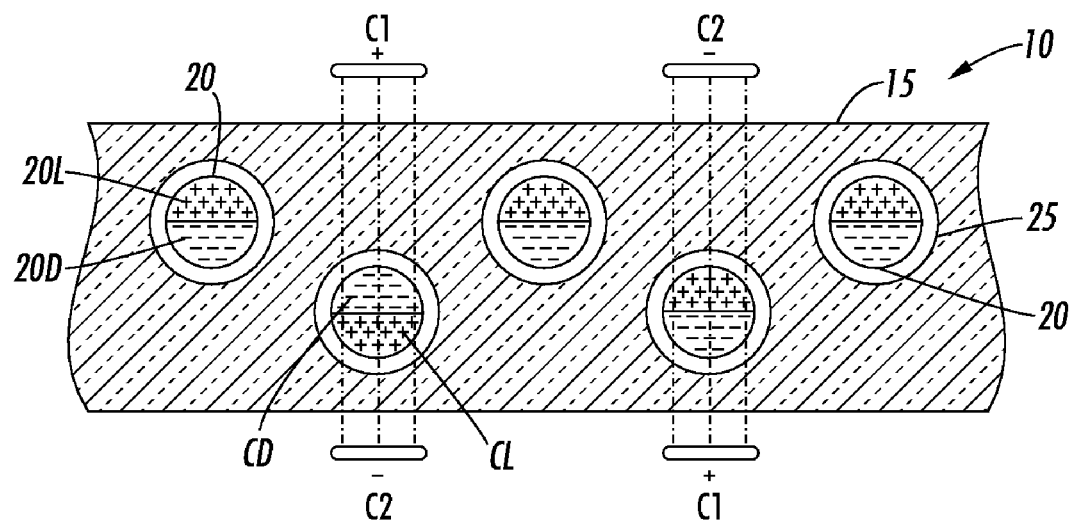
FIG. 1a is a cross sectional drawing of a portion of a display media showing spherical bichromal elements with hemispheres of different pigments and charges.
Figure 1B:
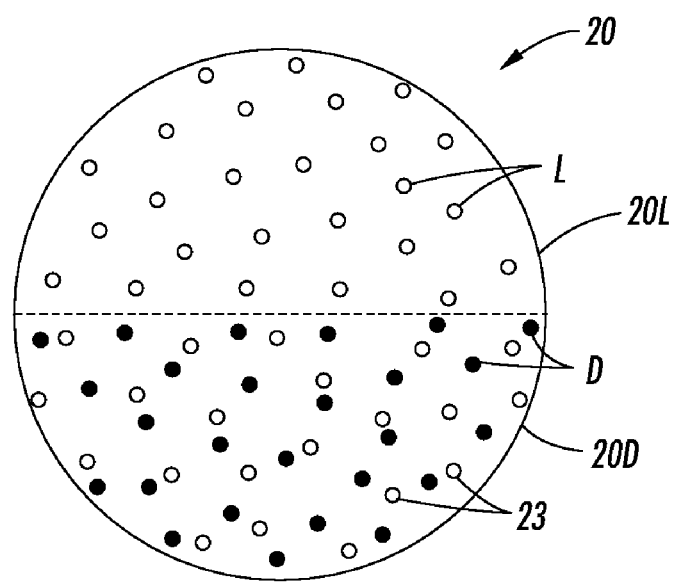
FIG. 1b is an enlarged drawing of a bichromal element of FIG. 1a showing polymers dispersed in a hemisphere.

Referring to FIG. 1a, there is shown a cross sectional view of a portion of a display media 10 comprising a plurality of bichromal elements 20 disposed in their respective cavities 25 which have a darker pigmented hemisphere 20D on one side and a lighter hemisphere 20L on the other side. FIG. 1b is an enlarged view of the bichromal balls 20 depicting lighter pigments "L" dispersed or contained in hemisphere 20L, and darker pigments "D" in hemisphere 20D. Polymers 23 are dispersed in hemisphere 20D containing the darker pigment "D". The display media 15 can be any media capable of displaying an image, such as a sheet, and may comprise any suitable material for housing the bichromal balls such as, for example, an elastomer material.

As shown in FIG. 1a, each of the hemispheres 20L and 20D contain electrical charges. Usually, the values of these charges are found to be dependent upon both the concentrations of pigments and the presence of the charge control agent (where present). However, it is desirable to minimize the influence of the pigment and maximize the influence of the charge control agents in order to be able to control the monopole and dipole charges for precise translation of the ball from one side of the cavity wall 25 to the other, and rotate completely. Charge control agents which promote improved control of monopole and dipole charges of bichromal elements are disclosed further below.

The monopole charge comprises the net charge on the bichromal element, expressed as proportional to CL+CD, where CL represents the total charge on one side, the white or lighter L side of the ball 20 and CD is the total charge on the black or darker D side of the ball, as shown in FIG. 1a. If CL (+) and CD (−) are of equal and opposite polarity, then the monopole charge CL+CD would be zero, as expected. Typically, they have the same polarity. The monopole charge is responsible for causing the ball to move from one cavity wall position to the opposite position, upon application of an electric field. Without this charge, the ball would remain locked to the cavity wall and rotation would be very difficult. The dipole moment causes the ball to rotate as it moves across the oil-filled cavity. The force causing this rotation is proportional to the dipole moment, which itself is proportional to CL−CD.

It is known that some charge enhancers, or adjuvants, augment the monopole and dipole charge distributions on the bichromal element. Examples of charge adjuvants include polymers such as polyalkyls such as polyethylene oxide, polypropylene oxide, polyethylene oxide-polypropylene oxide copolymers, ethoxylated alcohols, amides, amines, acids, phenols and derivatives thereof. The bichromal spheres or balls comprise a polymer having polyether functionality. The alkyl poly (alkylene oxide) have at least 4, and preferably from about 20 to about 100 alkylene oxide units per polymer molecule. Polymers having the highest ethylene oxide levels are desirable.

Commercially available examples of charge adjuvants include those from Baker/Petrolite UNITHOX® such as 5175 (acetate ester, $E_{16.7}$ $EO_{42}$, where the subscripts 16.7 and 42 indicate the percentage by weight of the molecules comprising ethylene, and ethylene oxide, respectively). There are several other commercially available adjuvants (see REFERENCES), but they are not described here any further in order not to unnecessarily obscure the present disclosure of the charge control agents. Suffice to say that charge adjuvants, as well as charge control agents, are selected so that they are not soluble in the dielectric liquid that fills the cavities in which the bichromal elements are contained. The adjuvants are added to the polymeric or wax base materials of bichromal elements, which are also available commercially. Examples of suitable waxes include carnauba wax and candelia wax. Pigments made by Ferro Corporation and Dupont are also used as pigments in the bichromal elements. However, because the total charge levels of the adjuvants are influenced to a considerable extent by the presence of pigments added to the hemispherical elements, further improvement is required by introducing agents that will have a larger influence in the control of the motion of the bichromal elements while leaving the contrast level of the colors of the hemispherical parts to the pigments with minimal influence on the over-all charge levels.

The following Table I shows exemplary Formulations 1-9 which are suitable for making bichromal elements having hemispherical portions that are positively or negatively charged without undesirable charge influence by the pigments:

| FORMULATIONS | Bichromal Hemispeheres | Polyethylene | Titanium Ox. | Spinel Black | Carbon Black | 5175 | Copy Charge PSY | Copy Charge N4P | Silicon Powder |
|---|---|---|---|---|---|---|---|---|---|
| Standard | White Side | 70.00% | 30.00% | | | | | | |
| | Black Side | 77.00% | | 20.00% | | 3.00% | | | |
| Formulation 1 | White Side | 70.00% | 29.25% | | | | | 0.25% | |
| | Black Side | 77.00% | | 23.00% | | | | | |
| Formulation 2 | White Side | 70.00% | 30.00% | | | | | | |
| | Black Side | 77.00% | | 22.50% | | | 0.50% | | |
| Formulation 3 | White Side | 70.00% | 29.25% | | | | | 0.75% | |
| | Black Side | 77.00% | | 22.75% | | | 0.25% | | |
| Formulation 4 | White Side | 80.00% | 19.00% | | | | | 1.00% | |
| | Black Side | 77.00% | | 22.50% | | | 0.50% | | |
| Formulation 5 | White Side | 80.00% | 19.25% | | | | | 0.75% | |
| | Black Side | 69.75% | | 30.00% | | | 0.25% | | |
| Formulation 6 | White Side | 80.00% | 20.00% | | | | | | |
| | Black Side | 69.90% | | 30.00% | | | | | 0.10% |
| Formulation 7 | White Side | 80.00% | 19.50% | | | | | | 0.50% |
| | Black Side | 70.00% | | 30.00% | | | | | |
| Formulation 8 | White Side | 80.00% | 20.00% | | | | | | |
| | Black Side | 68.00% | | | 30.00% | | 2.00% | | |
| Formulation 9 | White Side | 80.00% | 19.00% | | | | | 1.00% | |
| | Black Side | 70.00% | | | 30.00% | | | | |

The first Formulation shown is a standard formulation used as described above for comparison with the disclosed exemplary nine Formulations that use Charge Control Agents manufactured by Clariant Corporation under the brand name of Copy®. Table I lists various compositions comprising relative percentages of charge control agents Copy Charge PSY®, Copy Charge N4P® used with white pigment titanium oxide $TiO_2$ and black Spinel Black or Carbon Black in base material polyethylene. As is known, Spinel Black comprises $MgAl_2O_4$, magnesium aluminum oxide, while carbon black is a derivative of hydrocarbon. Silicon oxide powder shown in the Table and any other material with strong triboelectric properties, such as glass, may also be used suitably to control charges well. It should be noted that the compounds disclosed herein are not limited to those shown in Table I above, and that the percentage combinations may vary as follows:

Exemplary Formulation 1:
White Side—Polyethylene from about 50% to about 100%;
TiO2 from about 0.5% to about 50%;
Copy Charge N4P® from about 0.1% to about 10%;
Black Side—Polyethylene from about 50 to about 95%;
Spinel Black from about 5% to about 50%;
Exemplary Formulation 2:
White Side—Polyethylene from about 50% to about 100%;
TiO2 from about 0.5% to about 50%;
Black Side—Polyethylene from about 50 to about 95%;
Spinel Black from about 5% to about 50%;
Copy Charge PSY® from about 0.1% to about 10%;
Exemplary Formulation 3:
White Side—Polyethylene from about 50% to about 100%;
TiO2 from about 0.5% to about 50%;
Copy Charge N4P® from about 0.1% to about 10%;
Black Side—Polyethylene from about 50 to about 95%;
Spinel Black from about 5% to about 50%;
Copy Charge PSY® from about 0.1% to about 10%;
Exemplary Formulation 4:
White Side—Polyethylene from about 50% to about 100%;
TiO2 from about 0.5% to about 50%;
Copy Charge N4P® from about 0.1% to about 10%;
Black Side—Polyethylene from about 50 to about 95%;
Spinel Black from about 5% to about 50%;
Copy Charge PSY® from about 0.1% to about 10%;
Exemplary Formulation 5:
White Side—Polyethylene from about 50% to about 100%;
TiO2 from about 0.5% to about 50%; Copy Charge N4P® from about 0.1% to about 10%;
Black Side—Polyethylene from about 50 to about 95%;
Spinel Black from about 5% to about 50%;
Copy Charge PSY® from about 0.1% to about 10%;
Exemplary Formulation 6:
White Side—Polyethylene from about 50% to about 100%;
TiO2 from about 0.5% to about 50%;
Black Side—Polyethylene from about 50 to about 95%;
Spinel Black from about 5% to about 50%;
Silicon oxide from about 0.05% to about 10%;
Exemplary Formulation 7:
White Side—Polyethylene from about 50% to about 100%;
TiO2 from about 0.5% to about 50%;
Silicon oxide from about 0.05% to about 10%;
Black Side—Polyethylene from about 50 to about 95%;
Spinel Black from about 5% to about 50%;
Exemplary Formulation 8:
White Side—Polyethylene from about 50% to about 100%;
TiO2 from about 0.5% to about 50%;
Black Side—Polyethylene from about 50 to about 97%;
Carbon Black from about 3% to about 50%;
Copy Charge PSY® from about 0.1% to about 10%;
Exemplary Formulation 9:
White Side—Polyethylene from about 50% to about 100%;
TiO2 from about 0.5% to about 50%;
Copy Charge N4P® from about 0.1% to about 10%;
Black Side—Polyethylene from about 50 to about 95%;
Carbon Black from about 3% to about 50%;

The amount of charge control agency (CCA) may be in the range from about 0.1 to about 10% of total formulation by weight, mostly under 3% total formulation.

Further, any of Clariant Corporation's CCAs for toner applications under the brand name Copy® may also be used. These include: Hostacopy N4P-N101 VP2624; Hostacopy N4P-N203 VP2655; Hostacopy Charge PX04; Copy Charge NY VP2351; Copy Level NCS or Copy Blue PR Solvent Blue 124.

In addition, any similar charge control compounds manufactured by Aztech Ltd., Hitachi Chemical, Hodogaya Chemical, Esprix technologies may also be used, including: triphenylmethane, ammonium salts, al-azo complex, Ca-polymer salt, modified inorganic polymeric compounds, chromium compounds, aluminum salicylate, zinc salicylate, zirconium salicylate, boron salicylate, boron acetyl type, chrome-azo complex, iron-azo complex.

Figure 2A:
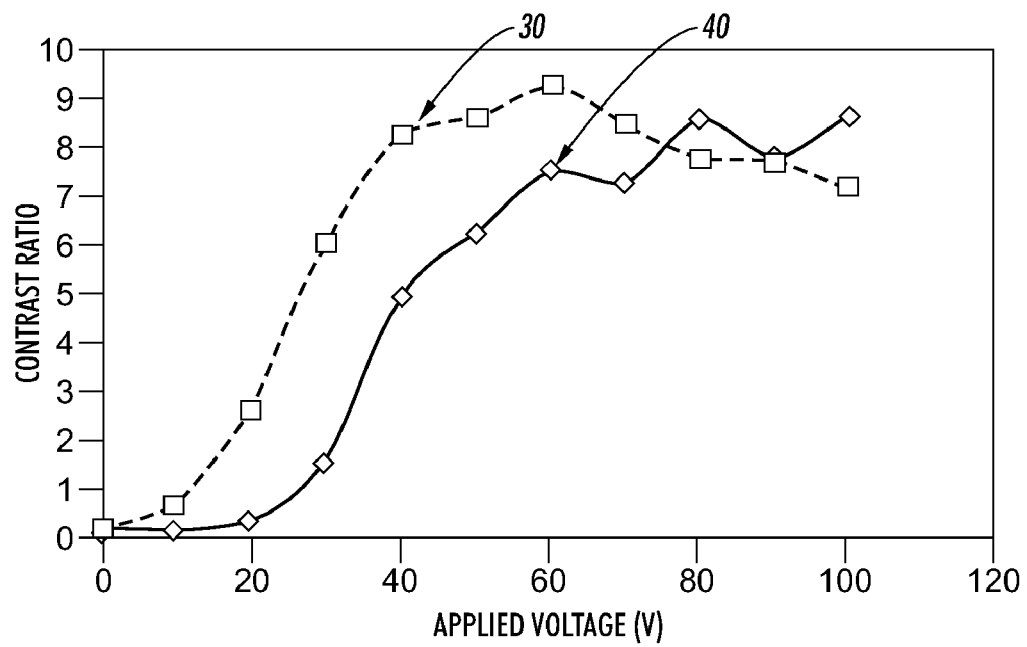
FIG. 2a is a drawing of a graph showing an aspect of an embodiment of the reduction of the operating voltage when Charge Control Agents are used in formulations for bichromal elements in a display media.
Figure 2B:
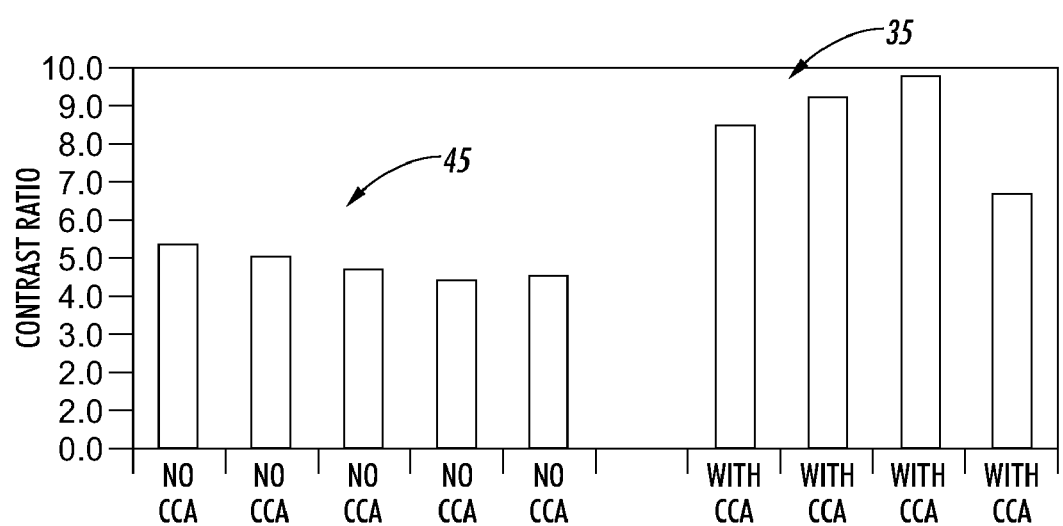
FIG. 2b is a drawing of a graph showing another aspect of an embodiment of the increase in the contrast ratio in the image of a display media when Charge Control Agents are used in the formulations for bichromal elements in the display.
Figure 3:
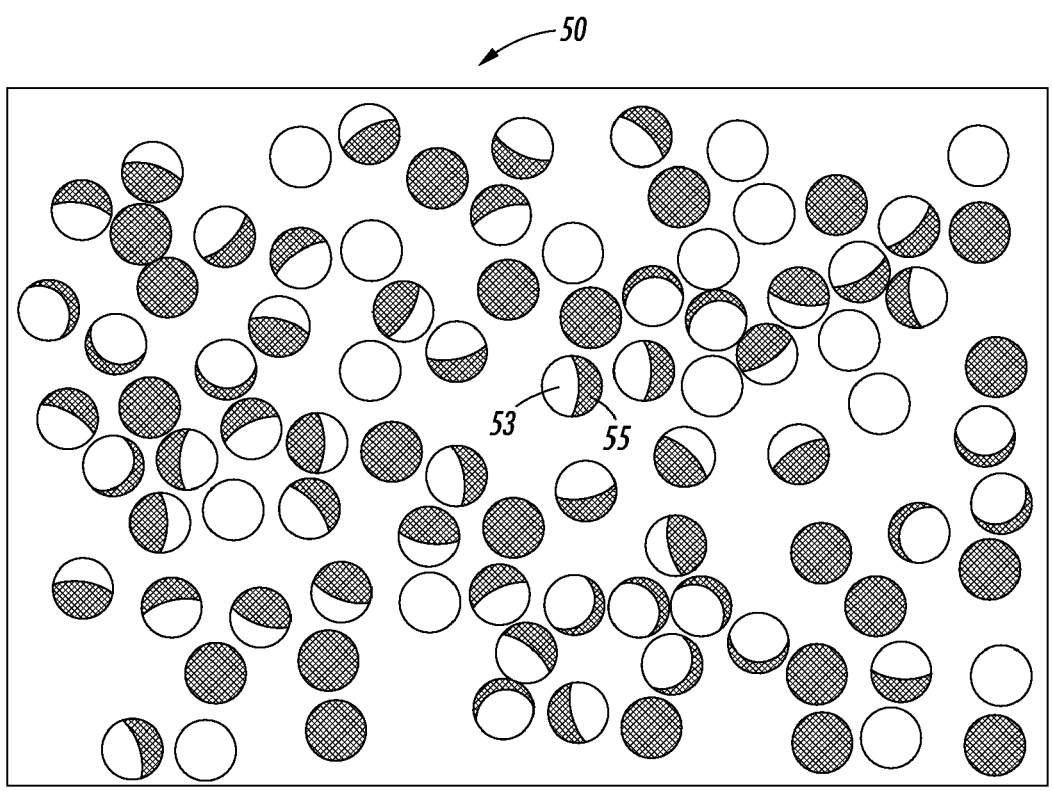
FIG. 3 is a photograph of a plurality of bichromal spheres.

It will be appreciated that the introduction of inorganic charge control agents (CCAs), which are known in xerographic industry, to the formulation of bichromal elements, brings their proven properties to electronic display media, such as the Gyricon display. These include: consistency in manufacturing process, sharper white/black hemispherical boundary; higher contrast ratios, enhanced performance at lower voltages with the attendant longer life. For example, FIG. 2a shows the reduction in the operating voltage of bichromal elements that have charge control agents 30 shown in Table I above versus those that do not 40. The reduction may be as high as 20 volts. FIG. 2b shows also the improvement in contrast ratio by about 50% when using CCAs 35 at 80 volts in comparison with the use of standard formulation 45 shown in Table I above. Five batches of the standard formulation 45 without CCA and four formulations 35 containing CCAs were made and contrasted throughout the day they were made. FIG. 3 shows a photograph of the bichromal spheres 50 of the present disclosure with their respective white hemispheres 53 and black hemispheres 55.

Though these numerous details of the disclosed display media are set forth here, such as formulation compositions, it will be understood that these specific details need not be employed to practice the present disclosure. At the same time, it will be evident that other portions, in the form of multi-sectors, or segments—instead of only hemispherical portions—may be used to form a multichromal element having multi-colors. The portions may comprise, but not limited to, from about 2 to about 16 sectors, more specifically from about 8 to about 16, and yet more specifically from about 2 to about 4 sectors of a body of revolution, such as a sphere or a spheroid. Multichromal elements may then be used to improve image definition through more precise rotation, with the aid of charge control agent (CCAs) disclosed above, to different orientations to expose (in sequence or in combination) more than two colors from the same multichromal element, and hence enhance the capabilities of the display media.

While the invention has been particularly shown and described with reference to a particular embodiment(s), it will be appreciated that variations of the above-disclosed embodiments(s) and other features and function, or alternatives thereof, may be desirably combined into many other different systems or applications Also that various presently unforeseen and unanticipated alternatives, modifications, variations or improvements therein may be subsequently made by those skilled in the art which are also intended to be encompassed by the following claims.

What is claimed is:

1. A display, comprising:
    a plurality of elements, each of said plurality of elements comprising multiple sectors, each of said multiple sectors having a different pigment thereon;
    a plurality of cavities in an elastomer medium, each of said plurality of cavities being arranged so as to constrain a motion of an associated one of the plurality of elements encapsulated therein;
    wherein each of the plurality of elements comprises a charge control agent selected so as to both reduce an influence of an electric charge established by said pigment and to increase an electric charge influence of said charge control agent relative thereto,
    wherein said increased electric charge influence of said charge control agent with respect to the electric charge established by said pigment is effective to control a monopole and a dipole charge effect of each of said plurality of elements so as to allow a precise translation of an element between walls of an associated cavity and to allow complete rotation of said element therein under an influence of an external electric field.

2. A display in accordance with claim 1, wherein said charge control agent is controlled to be in the range from about 0.1 to about 10% of total formulation by weight.

3. A display in accordance with claim 1, wherein said elastomer comprises a polysiloxane.

4. A display in accordance with claim 1, wherein said plurality of elements comprise bichromal elements microencapsulated in said cavities.

5. A display in accordance with claim 4, wherein said bichromal elements comprise spherical and/or non-spherical shapes including oval and cylindrical shapes.

6. A display in accordance with claim 1, wherein said multiple sectors comprise a plurality of colors.

7. A display in accordance with claim 1, wherein said multiple sectors comprise a first hemisphere and a second hemisphere.

8. A display in accordance with claim 7, wherein said first hemisphere is color white.

9. A display in accordance with claim 7, wherein said second hemisphere is color black.

10. A display in accordance with claim 7, wherein respective material compositions of said first and said second hemispheres are selected from the group consisting of Formulations 1 through 9 as indicated in Table I of the Specification.

11. A display in accordance with claim 7, wherein said first hemisphere comprises polyethylene, titanium oxide and silicon oxide.

12. A display in accordance with claim 7, wherein said second hemisphere comprises polyethylene, spinel black and silicon oxide.

13. A display in accordance with claim 7, wherein said second hemisphere comprises polyethylene and carbon black.

14. A display in accordance with claim 7, wherein said first hemisphere comprises polyethylene and titanium oxide.

15. The display of claim 1, wherein said charge control agent comprises an inorganic agent.

16. The display of claim 1, wherein said charge control agent is selected so as to reduce an operating voltage of a bichromal element incorporating the charge control agent relative to a standard operating voltage of the standard bichromal agent formulation described in Table I of the Specification.

17. The display of claim 1, wherein said charge control agent is selected so as to improve a contrast ratio of a bichromal element incorporating the charge control agent relative to a standard contrast ratio of the standard bichromal agent formulation described in Table I of the Specification.

18. A display media, comprising
an encapsulated medium; and
bichromal balls comprising two different pigments and a charge control agent selected so as to both reduce an influence of an electric charge established by said two pigments and to increase an electric charge influence of said charge control agent relative thereto;
wherein said bichromal balls are dispersed in said encapsulated medium,
wherein said increased electric charge influence of said charge control agent is effective to control a monopole and a dipole charge effect of said two different pigments on each of said bichromal balls so as to allow a precise translation of a bichromal ball between walls of an associated cavity and to allow complete rotation of said bichromal ball therein under an influence of an external electric field.

19. A display in accordance with claim 18, wherein said charge control agent comprises materials selected from the group consisting of Formulations 1 through 9 as indicated in Table I of the Specification.

20. A display in accordance with claim 18, wherein said charge control agent comprises triphenylmethane, ammonium salts, al-azo complex, Ca-polymer salt, modified inorganic polymeric compounds, chromium compounds, aluminum salicylate, zinc salicylate, zirconium salicylate, boron salicylate, boron acetyl type, chrome-azo complex, iron-azo complex or silicon oxide.

21. A display in accordance with claim 18, wherein said charge control agent is compatible for use with Polypropylene, Polyester, and other thermoplastic polymers.

22. A display in accordance with claim 18, wherein said charge control agent is in the range from about 0.1 to about 10% of total formulation by weight.

23. The display media of claim 18, wherein said charge control agent comprises an inorganic agent.

* * * * *